United States Patent [19]
Soell et al.

[11] Patent Number: 5,923,900
[45] Date of Patent: Jul. 13, 1999

[54] CIRCULAR BUFFER WITH N SEQUENTIAL REAL AND VIRTUAL ENTRY POSITIONS FOR SELECTIVELY INHIBITING N ADJACENT ENTRY POSITIONS INCLUDING THE VIRTUAL ENTRY POSITIONS

[75] Inventors: Werner Soell; Dieter Wendel, both of Schönaich; Friedrich-Christian Wernicke, Holzgerlingen, all of Germany

[73] Assignee: International Business Machines Corporation, Armonk, N.Y.

[21] Appl. No.: 08/814,511

[22] Filed: Mar. 10, 1997

[30] Foreign Application Priority Data

Mar. 10, 1997 [EP] European Pat. Off. ............. 97103926

[51] Int. Cl.$^6$ ........................................... G06F 13/14
[52] U.S. Cl. ............................. 395/860; 395/876
[58] Field of Search ..................... 395/876, 860, 395/673, 732

[56] References Cited

U.S. PATENT DOCUMENTS

| | | | |
|---|---|---|---|
| 3,967,249 | 6/1976 | Taniyama et al. | 395/857 |
| 4,028,664 | 6/1977 | Monahan et al. | 395/868 |
| 4,121,285 | 10/1978 | Chen | 395/860 |
| 4,482,949 | 11/1984 | Cates | 395/860 |
| 4,533,994 | 8/1985 | Harrill et al. | 395/860 |
| 5,091,874 | 2/1992 | Watanabe et al. | |
| 5,125,083 | 6/1992 | Fite et al. | 395/383 |
| 5,212,778 | 5/1993 | Dally et al. | 711/218 |
| 5,361,375 | 11/1994 | Ogi | 364/131 |
| 5,381,528 | 1/1995 | Brunelle | 395/876 |
| 5,491,824 | 2/1996 | Koshi | 395/732 |
| 5,513,375 | 4/1996 | Peters | 395/846 |
| 5,649,139 | 7/1997 | Weinreb et al. | 711/202 |
| 5,694,617 | 12/1997 | Webb et al. | 395/860 |
| 5,721,858 | 2/1998 | White et al. | 711/203 |
| 5,778,245 | 7/1998 | Papworth et al. | 395/800.23 |
| 5,832,304 | 11/1998 | Bauman et al. | 395/860 |

FOREIGN PATENT DOCUMENTS

| | | |
|---|---|---|
| 0 507 571 A2 | 10/1992 | European Pat. Off. . |
| 0 533 337 A1 | 3/1993 | European Pat. Off. . |
| 94/11800 | 5/1994 | WIPO . |

*Primary Examiner*—Thomas C. Lee
*Assistant Examiner*—Ilwoo Park
*Attorney, Agent, or Firm*—Lynn L. Augspurger

[57] ABSTRACT

The invention relates to a circular buffer containing a sequence of entries, and in particular to determining a sequential priority among entries which both fulfill a given condition and are contained in said sequence. This problem is not straightforward, because said sequence of entries may wrap-around in said circular buffer, which means that said sequence of entries extends beyond the last entry position of the buffer. According to the invention, first, a number of virtual entry positions, which is at least equal to the number of real entry positions in the buffer, is added to the non-occupied part of the buffer. In a second step, each entry which fulfills the given condition blocks a certain number of adjacent entries, including said virtual entries. One entry will remain which is not blocked, and which also fulfills the given condition. This entry is the entry with sequential priority.

14 Claims, 7 Drawing Sheets

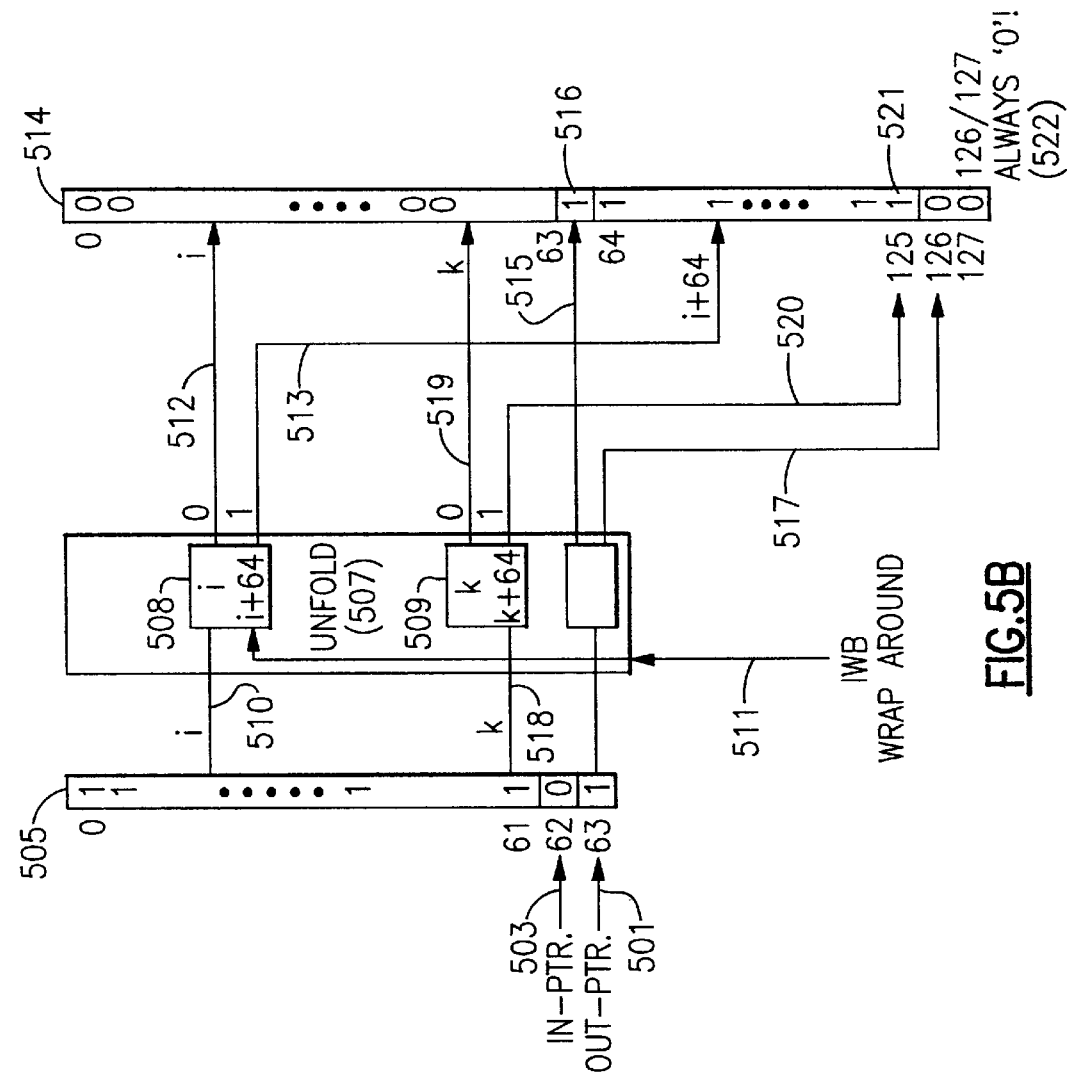
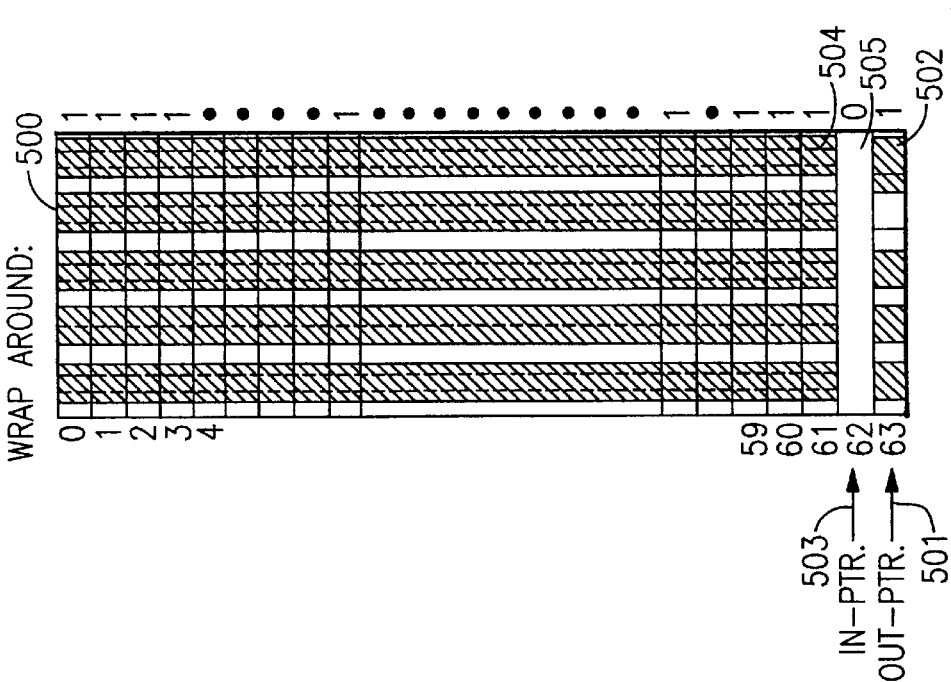
FIG.5B
FIG.5A

CIRCULAR BUFFER WITH N SEQUENTIAL REAL AND VIRTUAL ENTRY POSITIONS FOR SELECTIVELY INHIBITING N ADJACENT ENTRY POSITIONS INCLUDING THE VIRTUAL ENTRY POSITIONS

FIELD OF THE INVENTION

The invention relates to a circular buffer containing a sequence of entries and in particular to determining a sequential priority among entries in said circular buffer, whereby said entries also have to fulfill a given criterion.

BACKGROUND OF THE INVENTION

When implementing a first in first out (FIFO) buffer, a circular buffer is used, to which a sequence of entries is stored. New entries are added to the head of the sequence of entries, and old entries are removed from the sequence's tail. By adding new entries and removing old entries, the active window in said circular buffer starts moving, it crawls around said circular buffer like a worm, it contracts and expands.

Whenever said sequence of entries extends beyond the last entry position of the buffer, wrap-around occurs, which means that the latest entries of said sequence are accommodated in the first entry positions of said buffer.

As said entries are arranged in a sequence of entries, an order exists between these entries. Situations arise where this order becomes important because, for example, the oldest or the youngest entry fulfilling a certain condition has to be selected. Different entries, which might, for example, both fulfill a given criterion, have to be compared with respect to their sequential priority.

One solution to this problem is to always leave a gap between the entry sequence's tail and the entry sequence's head, and to cause an instruction, which fulfills said criterion, to block younger instructions.

An disadvantage of this solution is that buffer space is wasted, because the buffer entries can not be fully utilized.

OBJECT OF THE INVENTION

It is an object of the invention to provide a method for determining sequential priority of entries fulfilling a given condition in a wrap-around buffer, in which a continuous sequence of real entry positions ranging from a first entry of said sequence to a last entry of said sequence exists, and a corresponding wrap-around buffer which avoids the drawbacks of prior art solutions.

SUMMARY OF THE INVENTION

The object of the invention is solved by a wrap-around buffer according to claim 1 and by a method for determining sequential priority of entries in a wrap-around buffer according to claim 9.

First, at least an additional virtual entry positions are provided to the non-occupied part of the wrap-around buffer.

In a second step, the sequentially most recent entry or the sequentially least recent entry of a subset of predetermined entries is determined by inhibiting starting from each of said predetermined entries of said subset of predetermined entries, at least (n−1) adjacent entry positions including said virtual entry positions.

By adding virtual entry positions, it is possible to widen the gap between the entry sequences head and the entry sequences tail without leaving large parts of the circular buffer unoccupied. An easy blocking mechanism, which is cheap to implement is used to block selected entries that do not have sequential priority. The "surviving" is the entry having sequential priority.

Said subset of predetermined entries can contain entries fulfilling any given criterion. Thus, said method of selecting entries with sequential priority can be applied to any selection criterion.

BRIEF DESCRIPTION OF THE DRAWINGS

FIG. 5A shows a wrapped state of the circular buffer, used as a second example.

FIG. 5B shows how the size of the initial bit string is doubled by the unfold logic.

DETAILED DESCRIPTION OF THE INVENTION

Figure 1:
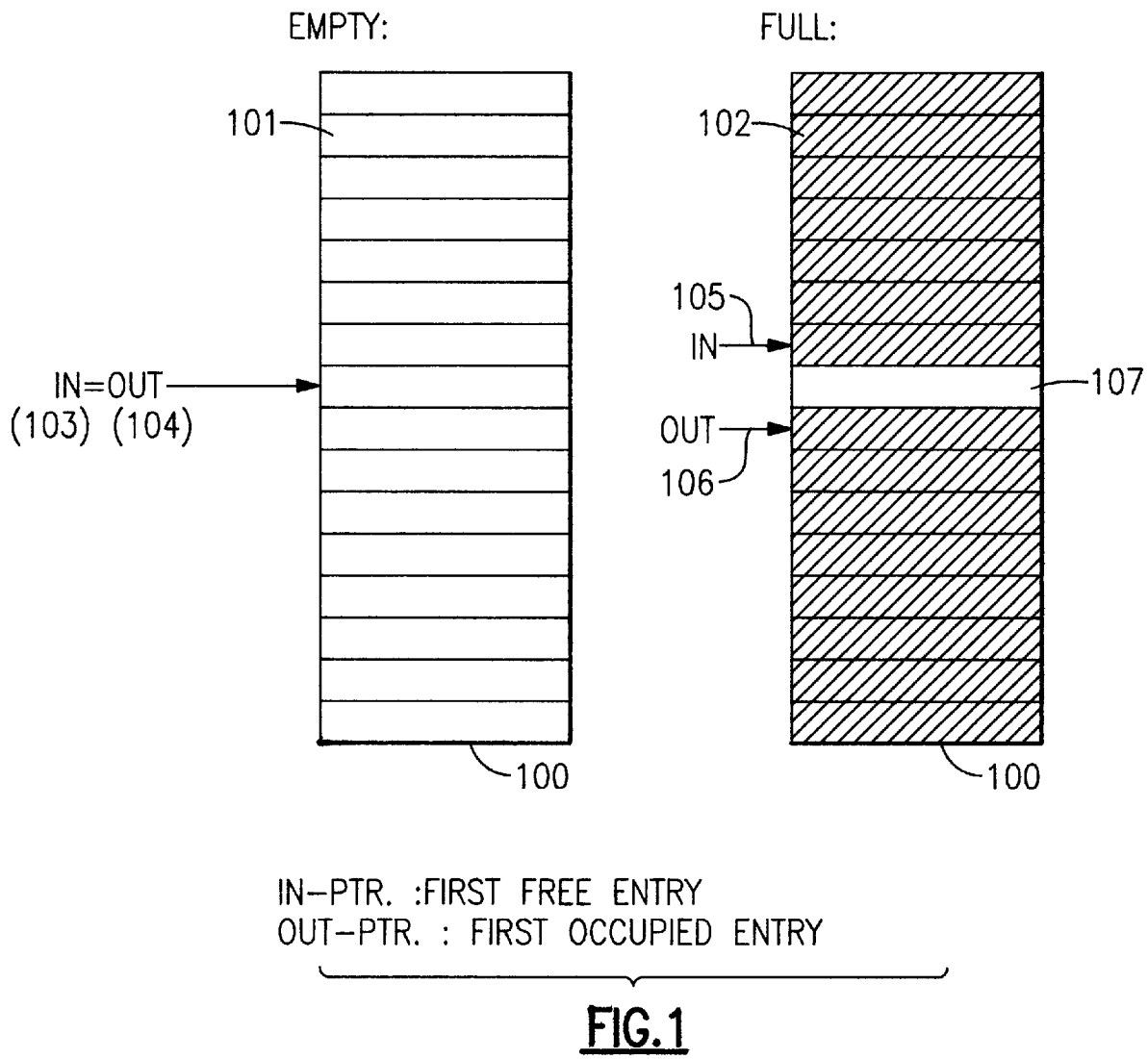
FIG. 1 shows two different states of a circular wrap-around buffer, whereby each state can be characterized by the position of the respective in-and out-pointer.

FIG. 1 shows two states, the "empty" state and the "full" state, of a circular buffer. A circular buffer (100) comprises a set of entry positions (101), which can either contain an entry (102) or not (101). When entries having a sequential order are written to said circular buffer, it is necessary to take care of this order when accommodating said entries. Usually two pointers are provided, an in-pointer (103) and an out-pointer (104), which allow to run said circular buffer as a FIFO (first in first out) buffer. The in-pointer points to the first free entry position (107) of the circular buffer, which is adjacent to the buffer's most recently occupied entry. The in-pointer thus defines the head of the stored entry sequence. Whenever a new entry is to be written to the buffer, it is placed at the entry position specified by the in-pointer. The in-pointer is then incremented, in order to again point to the next available entry position. The in-pointer thus defines the head of the entry sequence stored in the circular buffer.

In contrary, the entry sequence's tail is defined by the out-pointer (106), which points to the first occupied entry position, which is the oldest entry position of said sequence of entry positions. Whenever an entry of the FIFO has to be chosen that is to leave the FIFO, the entry determined by the out-pointer (106) is chosen, because it is the sequentially oldest entry. Next, the out-pointer is incremented, and thus, a new non-occupied entry position becomes available.

In case the circular buffer is empty, both the in-pointer (103) and the out-pointer (104) point to the same entry position. In case the circular buffer is full, which means that as many entries are written to its entry positions as possible, there still exists non-occupied entry position (107), to which the in-pointer (105) points. The out-pointer (106) points to the entry position adjacent to said empty entry position (107). Thus, it is possible to distinguish the empty state and the full state by just looking at the respective positions of the in- and out-pointer.

By adding new entries to the entry sequence's head, and by removing old entries from the entry sequence's tail, the entry sequence starts moving. It can be thought of as a worm, which may crawl forward, which may expand, and which may contract.

Figure 2B:
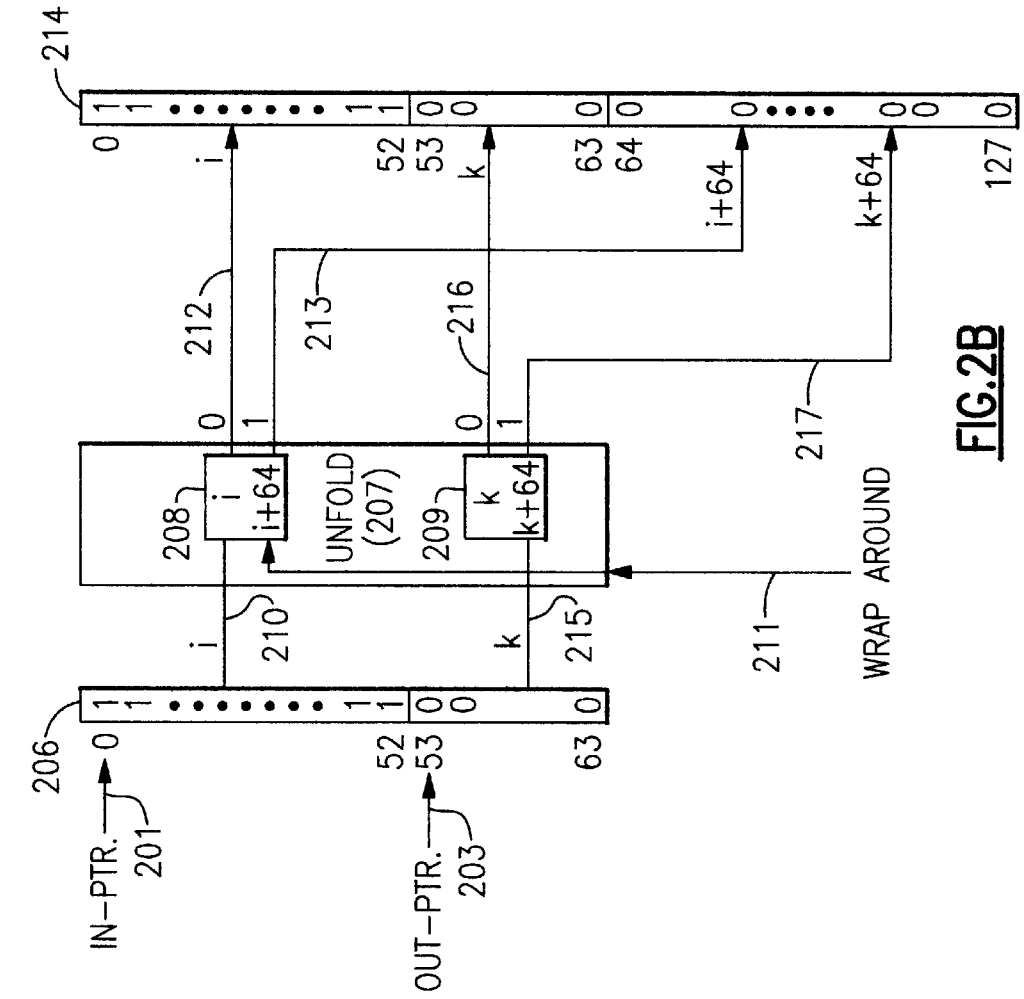
FIG. 2B shows how the initial active bit string can be unfolded in order to double the bit string's size.
Figure 2A:
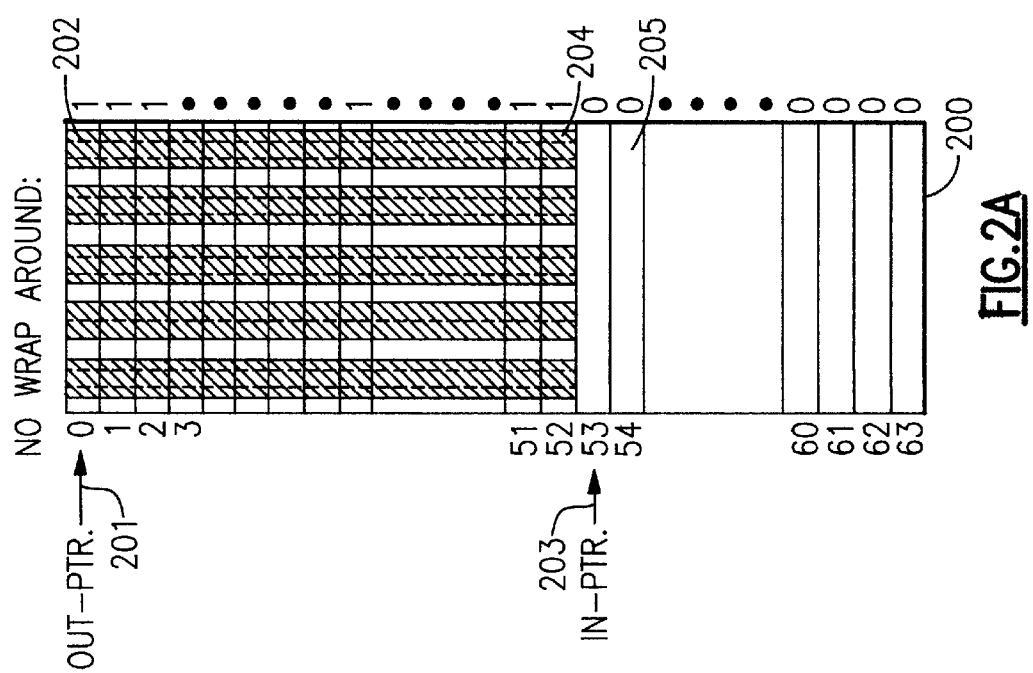
FIG. 2A shows a non-wrapped state of the circular buffer, which will be used as an example.

By the example given in FIG. 2A, it will be shown how a multitude of virtual entry positions can be added to the real entry positions of a circular wrap-around buffer. The sequence of occupied entries extends from entry position 0 to entry position 52. Therefore, in this case, the sequence of entries constituting the active window does not wrap around in the circular buffer, the sequence of occupied entries does not occupy both the entry positions 63 and 0. The range of the active window is defined by the position of the out-pointer (201), which indicates that entry position 0 holds the least recent entry (202) of said sequence of entries, which is usually the oldest entry. Entry position 52 holds the most recently added entry (204), which is indicated by the in-pointer (203) pointing to the adjacent available entry position 53 (205), which is the first non-occupied entry position.

Depending on whether a given one of the 64 entry positions of the circular buffer is occupied or not, an "active bit" is set in the "active bit string" (206), which consists of 64 bits corresponding to the 64 circular buffer entries. The sequence of 1's in said active bit string (206) thus indicates the sequence of entries in the circular buffer ranging from the out-pointer (201) to the entry position preceding the in-pointer (203). For each non-occupied entry position of the circular buffer, a "0" is set at the corresponding position of the active window string (206). In our example, the zeros extend from bit string position 53 to bit string position 63.

The task of the circuit given in FIG. 2B is to add 64 bits corresponding to virtual entry positions to the 64 bits of the active window string 206. The circular buffer only comprises 64 real entry positions. Therefore, there do not exist entry positions in the circular buffer corresponding to said virtual entry position. The task of unfolding the active window string is accomplished by the unfold logic (207) comprising one unfold circuit (208, 209) per bit of said active window string. Therefore, there have to exist 64 of said unfold circuits (208, 209) in parallel.

Each bit of the active window string, for example bit i (210), is set as an input to its corresponding unfold circuit (208). There exist two outputs of each unfold circuit. The first output of unfold circuit i (212) writes to bit i of the extended bit string 214, which comprises 128 entries. The second output (213) of said unfold circuit writes to bit i+64 of said extended bit string 214, which represents both the status of the real entry positions and of the additional virtual entry positions. in case the input i (210) of the unfold circuit 208 is equal to 1, a 1 occurs at one of the outputs 212 or 213. The additional wrap-around input 211 of that unfold circuit determines whether bit i or bit i+64 of the extended bit string 240 will contain the "1". input 211 is inactive in case no wrap-around has occurred. This is the case in the example depicted in FIG. 2A, and therefore, output i will be set to "1" (212), and output i+64 will be set to "0" (213).

input k (215) corresponds to the non-occupied entry positions of the circular buffer, and is therefore equal to "0". in this case, both outputs of the corresponding unfold circuit 209 are equal to "0". A "0" is written both to position k (216) and to position k+64 (217) of the extended bit string 214.

Because in this example there has been no wrap-around, all "1's" contained in the active window string 206 have been forwarded to the lower half of the extended bit string 214.

Figure 3:
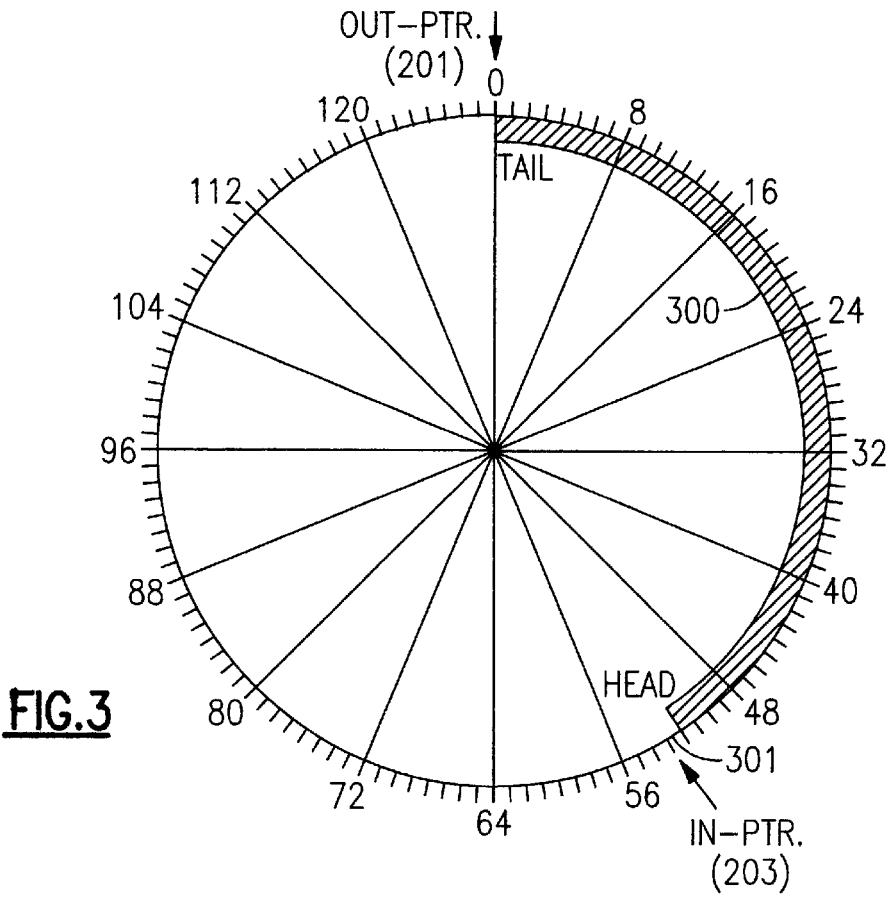
FIG. 3 gives a graphical representation of the active bit string after unfolding has been performed.
Figure 4:
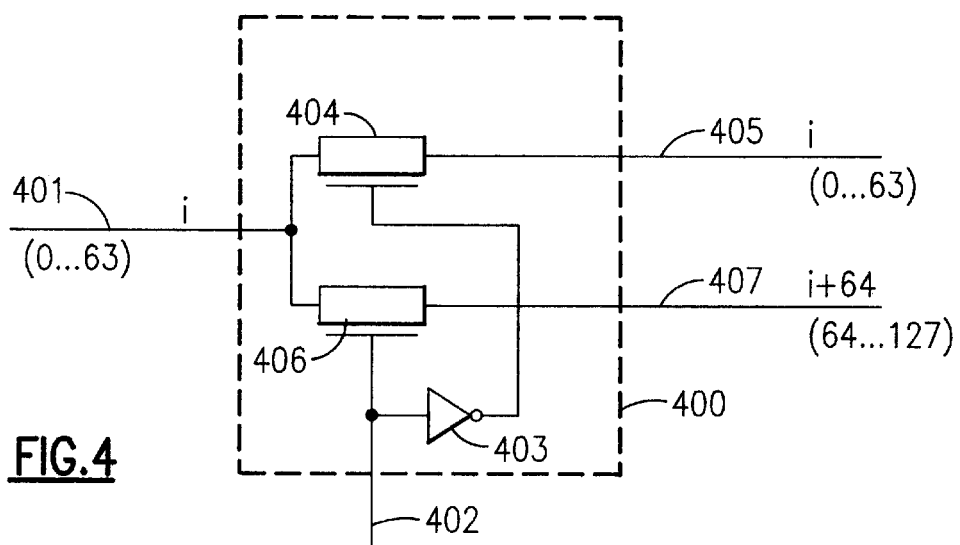
FIG. 4 depicts a possible circuit for expanding the initial bit string.

The structure of the resulting active bit string 214 is shown in a graphical representation, in FIG. 3. Because all the "1's" of the initial active window string have been forwarded to an identical position in the extended window string (no wrap-around !) Bit 0–52 (300) of the extended bit string 214 are filled with "1's". The rest of the extended bit string 214 contains zeros. The zeros contained in bits 53–63 correspond to the zeros at bit position 53–63 of the initial active window string 206. Bits 64–127 of the extended bit string 214 are also filled with zeros, because all the i+64 outputs of all the unfold circuits have written zeros to the upper half of the extended bit string 214. This has been done because there has not been any wrap-around in the present example.

in FIG. 4, a possible implementation of one of said unfold circuits (208, 209) is given (400). Bit i of the active window string is forwarded as an input (401) to said unfold circuit. The wrap-around input (402) determines to which output (405, 407) said input bit is forwarded to. First, it is determined whether wrap-around exists or not. in case both the entry position 0 and the entry position 63 hold active entries, wrap-around exists. in case wrap-around exists, it is determined, in a second step, whether the entry number i of the bit considered is less than the entry number the out-pointer points to.

If both conditions are fulfilled, the wrap-around input 402 is set to "high", FET 406 corresponding to output 407 is activated, and FET 404, which receives said wrap-around signal 402 via inverter 403, is disabled. This implies that in case of wrap-around a "zero" appears (405), which writes to bit i of the extended bit string 214. Input 401 is forwarded to the output 407 which writes to bit i+64 of said extended bit string.

In case there is no wrap-around, the wrap-around input 402 is "low", FET 406 is disabled and FET 404 is activated. This means that input 401 is forwarded to output 405, which writes to the first half of said extended bit string 214, and a zero appears on output 407.

The implications of this circuit will become more clear when looking at a buffer state where wrap-around exist. Such a state is depicted in FIG. 5A. There, the oldest entry (502) of the sequence of active entries can be found at entry position 63, as indicated by the out-pointer 501, which marks the tail of the active window string. When following the sequence of occupied entries, starting from said tail, a wrap-around occurs from entry position 63 to entry position 0. As both entry positions 63 and entry position 0 contain active entries, the first condition of the wrap around signal 402 in FIG. 4 is fulfilled. The sequence of active entries extends up to entry position 61 (504). The entry at entry position 61 defines the head of the active sequence. This is indicated by in-pointer 503 pointing to the next available entry position (505), which is the only non-occupied entry position.

in FIG. 5B, the translation of the active window string 506 to an extended bit string 514, comprising 128 entries, is explained. The initial active window string comprises a sequence of "1's" from bit 0 to bit 61, a "0" at bit 62 and a "1" at bit 63. Obviously, when wrap-around occurs, the active sequence is divided into two parts: A front part, ranging from entry position 0 to the entry position preceding the in-pointer, and rear part, ranging from the entry position specified by the out-pointer up to entry position 63.

The second condition given in the condition box of FIG. 4 demands that the entry position under consideration is less than the entry number the out-pointer points to. For the front part of the active sequence, from 0 to 61, this condition is fulfilled. But for all entries belonging to the rear part of the active entry sequence, this condition is not fulfilled. in our example, the rear part just comprises one entry position, entry position 63, which is not less than the entry position the out-pointer points to. Thus, in case of wrap-around, the wrap-around signal is active for all entries belonging to the front part of said sequence of occupied entries and said wrap-around signal is inactive for all entry positions belonging to the rear part of said active sequence.

Bit i (510) belongs to the front part of the active window string 506. Therefore wrap-around signal 511 is active. The unfold circuit 508, which corresponds to bit i, therefore forwards the "1" of input 510 to the i+64 output 513, and thus a "1" is written to position i+64 of the extended bit string 514. Correspondingly, a "0" appears at output 512 of said unfold circuit 508, and thus a "0" is written to position i of said extended bit string. Correspondingly, the "1" contained in position 61 of the active window string is forwarded to output 520 and written to position 125 of the extended bit string 514. Position 125 therefore holds a "1" (521). Correspondingly a "0" is written to position 61 of bit string 514. Thus, position 62 of bit string 506 contains a 0, and said 0 is also written to both position 62 and 126 of the extended bit string 514.

Figure 6:
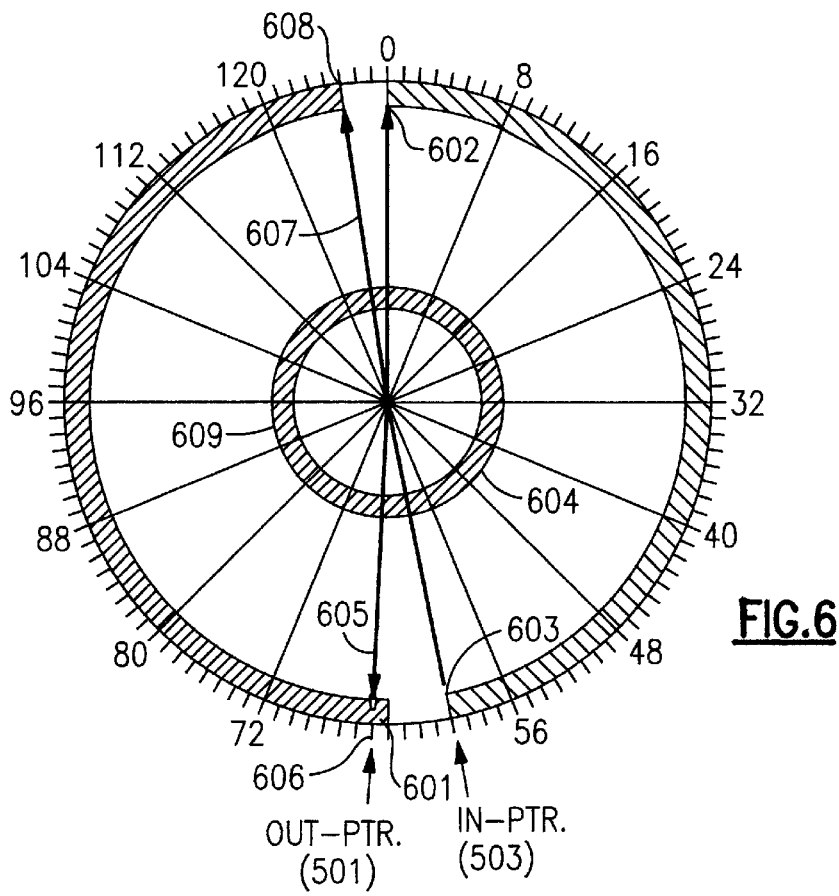
FIG. 6 gives a graphical representation of the second example's active bit string in its expanded state.

The situation is different for the "1" contained at entry position 63. Here the second condition of the condition box of FIG. 4 is not fulfilled, because entry position 63 is not less than the position the out-pointer 501 points to. The "1" contained in position 63 of the active window string 506 is therefore forwarded to output 515 and written to position 63 of the extended bit string 514 (516). The second output (517) corresponding to entry position 63 of the initial bit string is not active, because said condition is not fulfilled. Therefore, a "0" is written to entry position 126 of said extended bit string. Entry positions 126 and 127 do always contain a zero (522).

in FIG. 6, the resulting structure of the extended bit string is given. The rear part of the initial active window string just comprises the entry at entry position 63 (601). The front part of said initial active window string comprises the entries from entry position zero (602) up to entry position 61 (603). But the "1's" contained in said front part of said initial active window string (604) are not identically copied to the extended bit string, because both conditions in the condition box of FIG. 4 are fulfilled. Instead, the "1" contained in entry position zero (602) is mapped (605) to a "1" in entry position 64 (606). Accordingly, the one contained in entry position 61 (603) is written (607) to entry position 125 (608) of the extended bit string 514. Thus, the whole segment 604 of the initial active window string is copied to segment 609 in the upper half of the extended bit string. The former entries of active window bit 604, contained in the lower half of the extended bit string, are filled with zeros. Thus, while the rear part of the initial sequence of occupied entries remains unchanged (601), the whole front part of said sequence of active entries is completely transferred to the upper half of the extended bit string.

By doing this, the active entry sequence which has been torn in two parts by adding 64 virtual entries between entry position 63 and entry position zero is reassembled, in order to form one continuous sequence ranging from entry position 63 to entry position 125. In the gap between the most recent entry (608) and the oldest entry (601), 64 virtual entries, all containing zeros, have been added in order to form said extended bit string. While said gap initially only consisted of one unoccupied entry (505) at entry position 62, the gap now contains 65 non-occupied positions, but 64 of said non-occupied entry positions are virtual entry positions, which do not correspond to any real buffer entries. Thus, said gap has virtually been increased.

Figure 7:
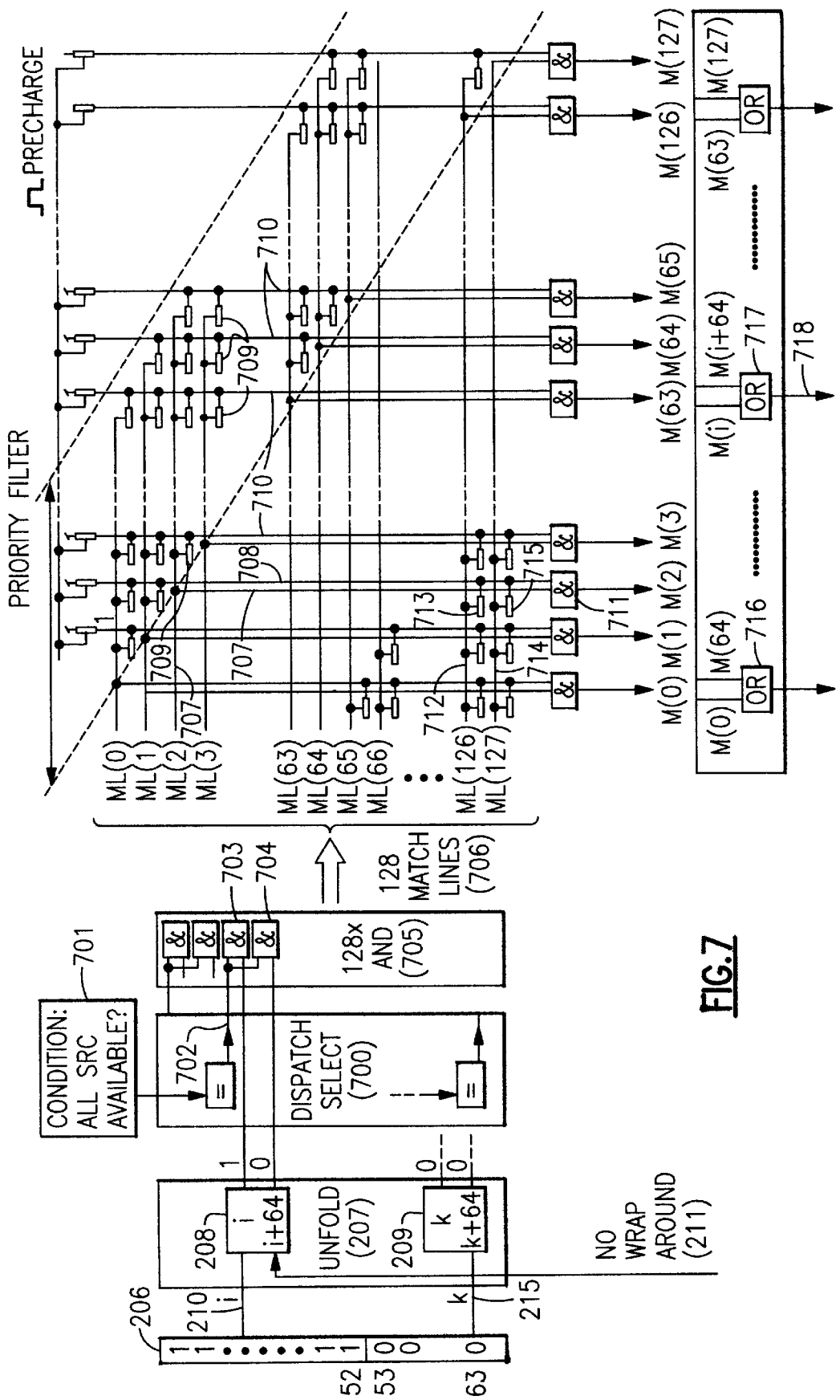
FIG. 7 shows how a priority filter for selecting an entry having sequential priority is realized.

In FIG. 7, it is shown how the entries of said extended bit string are forwarded to a sequential priority network. As an example, the same buffer state as depicted in FIG. 2A is chosen. The circular buffer contains a sequence of entries ranging from entry position 0 to entry position 52, without wrap-around. This is represented by a corresponding sequence of ones and zeros in the active window string 206, which comprises 64 entries. Said 64 entries are forwarded to the unfold logic (207), which uses the bits of the active window string 206, and wrap-around information (211), as an input, and which produces a 128-bit wide extended bit string as an output. This extended bit string is produced according to the method given in FIG. 2B, and therefore, the structure of the resulting extended bit string 214 is identical to the structure given in FIG. 3. This extended bit string is forwarded to the dispatch select unit 700. Here, a criterion is applied to each active bit position of said extended bit string. Only the active bits of the extended bit string which also fulfill said criterion are forwarded to the sequential priority network.

By an example it will become more clear how said criterium can be defined. In out-of-order processing systems instructions are first issued to an instruction window buffer, before they are dispatched to their respective execution units. In said instruction window buffer, each instruction is assigned an entry, which holds the instruction itself, source and target operand identifiers, and status bits. Each entry remains in the instruction window buffer until all its source operands have been calculated and are available. As soon as all its source operands are available, an instruction can be dispatched to one of the execution units. Said instruction window buffer is usually implemented as a circular buffer. This means that a new instruction from the instruction string is written to the first free entry of the instruction queue in the window buffer. This first free entry is the entry the in-pointer points to. The end of the queue, which may wrap-around, is indicated by the out-pointer. Said out-pointer thus points to the entry holding the oldest instruction of the queue.

In each cycle, instructions of the instruction window buffer, which are "ready for dispatch", have to be selected. According to the processing capabilities and to the number of available execution units, a limited number of instructions may be dispatched to the execution units. A prerequisite for dispatching an instruction is that all the instruction's source operands are available. This is usually indicated by "source valid" bits. in case all source valid bits of said instruction's source operands are set, said instruction is "ready for dispatch". The "criterium" mentioned above is, in this case, that all the instruction's source operands are available.

But after determining which instructions, in said queue of active instructions, fulfill the dispatch criterium, there might still remain a lot of "ready for dispatch" candidates, and not all of them can be dispatched in one cycle. Therefore, among those candidates, a selection according to their priority has to be made. The oldest instructions that are "ready for dispatch" are to be dispatched first. For this reason, a priority logic has to determine those of the instructions with all sources available having the highest priority.

Let's now go back to FIG. 7 and have a look at the dispatch select logic (700). The unfold logic (207) has delivered an active bit string holding a "1" for each active instruction entry. To this extended bit string, the criterium whether all the instruction's sources are available (701) is applied. As both entries i and i+64 correspond to one physical entry, the "all sources available" signal (702) is simultaneously applied to position i and i+64 of said extended bit string. This is done by forwarding said "all sources available" signal (702) to one AND-gate (703, 704) per bit position of said extended bit string. By feeding the extended bit string, which contains a "1" per active entry of the instruction window buffers queue, to a row of 128 AND-Gates (705), only those active bits survive for which the criterium "all sources available" (701) is fulfilled. These are the possible candidates for dispatch, among which a priority has to be determined. The 128 outputs of said AND-gates (703, 704 . . . ) are called "match lines" (706). All 128 match lines are forwarded to a priority filter.

The task of the priority filter is to determine the oldest one of all active match lines (706).

For each match line ML(0) to ML(127), a corresponding inhibit line exists. The idea behind the priority filter circuit given if FIG. 7 is that each active match line should be able to block the 63 following match lines, which represent younger entries, by activating their inhibit lines.

As an example let us consider match line ML(2) (707). When said match line is active, one of the two inputs of AND-gate 711 is high. The inhibit line 708 corresponds to ML(2). Said inhibit line 708 is initially on "high", and it remains on "high", unless one of the 63 preceding match lines pulls it on "low". In case said inhibit line 708 is not pulled on "low" by any of the preceding match lines, both inputs of AND-gates 711 are active and therefore, the AND-gate's output M(2) is active.

Because ML(2) (707) is active, all the FETs 709 are activated, which pull the inhibit lines corresponding to ML(3), ML(4), ML(65) to "low". Thus, ML(2) blocks all the following 63 match lines. Because of the inhibit lines 710 being pulled to "low", M(3) to M(65) will not be active.

M(0) to M(127) represent the resulting outputs of the priority filter. Exactly one of these signal lines will be active, and this signal line indicates the buffer entry which both fulfills the criterion and has sequential priority in our case, said priority filter output will indicate the oldest buffer entry with all sources being available.

In order to relate these output signals to the buffer entries, the virtual entries added by the unfold logic 207 have to be removed. This is done by ORing (717) output M (i) with output M (i+64). The output 718 of OR-gate (717) will determine whether buffer entry i is the oldest buffer entry with all sources available.

Figure 8:
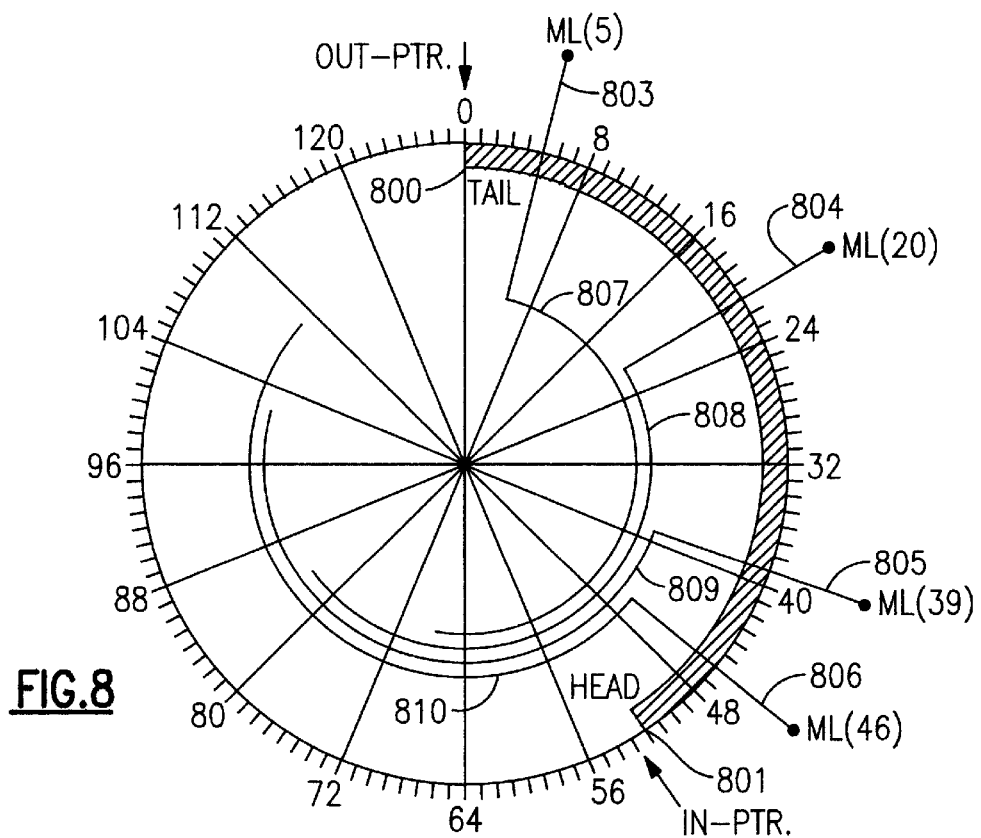
FIG. 8 shows how each match line activates a corresponding inhibit line, in order to block all match lines with lower priority than itself.

FIG. 8 shows how one active match line can block the following 63 match lines. The active entry sequence ranges from the oldest entry (800) indicated by the out-pointer, to the latest entry 801, preceding the in-pointer. As there is no wrap-around, the unfold logic (207) just adds 64 virtual entries ranging from entry 64 to entry 127. Let us assume that four match lines, ML(5) (803), ML(20) (804), ML(39) (805) and ML(46) (806) fulfill a given criterion. Among these four candidates, the oldest one has to be determined by the priority logic. Each active match lines blocks the following 63 match lines by activating the inhibit lines of said 63 following match lines. Thus, match line(5) (803) blocks all match lines ranging from 6 to 68 (807). The range of inhibited match lines is always indicated by a half-circle. Match line 804 blocks the range 808 of match lines, match line 805 blocks the range 809, and match line 806 blocks the range 810. The only match line which will not be blocked by another match line is ML(5). ML(5) is in fact the oldest match line. Therefore M(5) will be active, it will be ORed with M(68), which is inactive, and the result will indicate that entry 5 is the oldest entry with said criterion being fulfilled.

FIG. 8 also indicates why virtual entries have to be added to the active window string. Otherwise, the gap between the tail and the head of the queue would not be big enough, and an old match line could be blocked by a more recent match line. This is avoided in the solution given.

The circuit of FIG. 7 is also applicable when the most recent entry has to be determined. In this case, match line blocking has to occur in the opposite direction. An active match line would have to block the 63 preceding entries.

Figure 9:
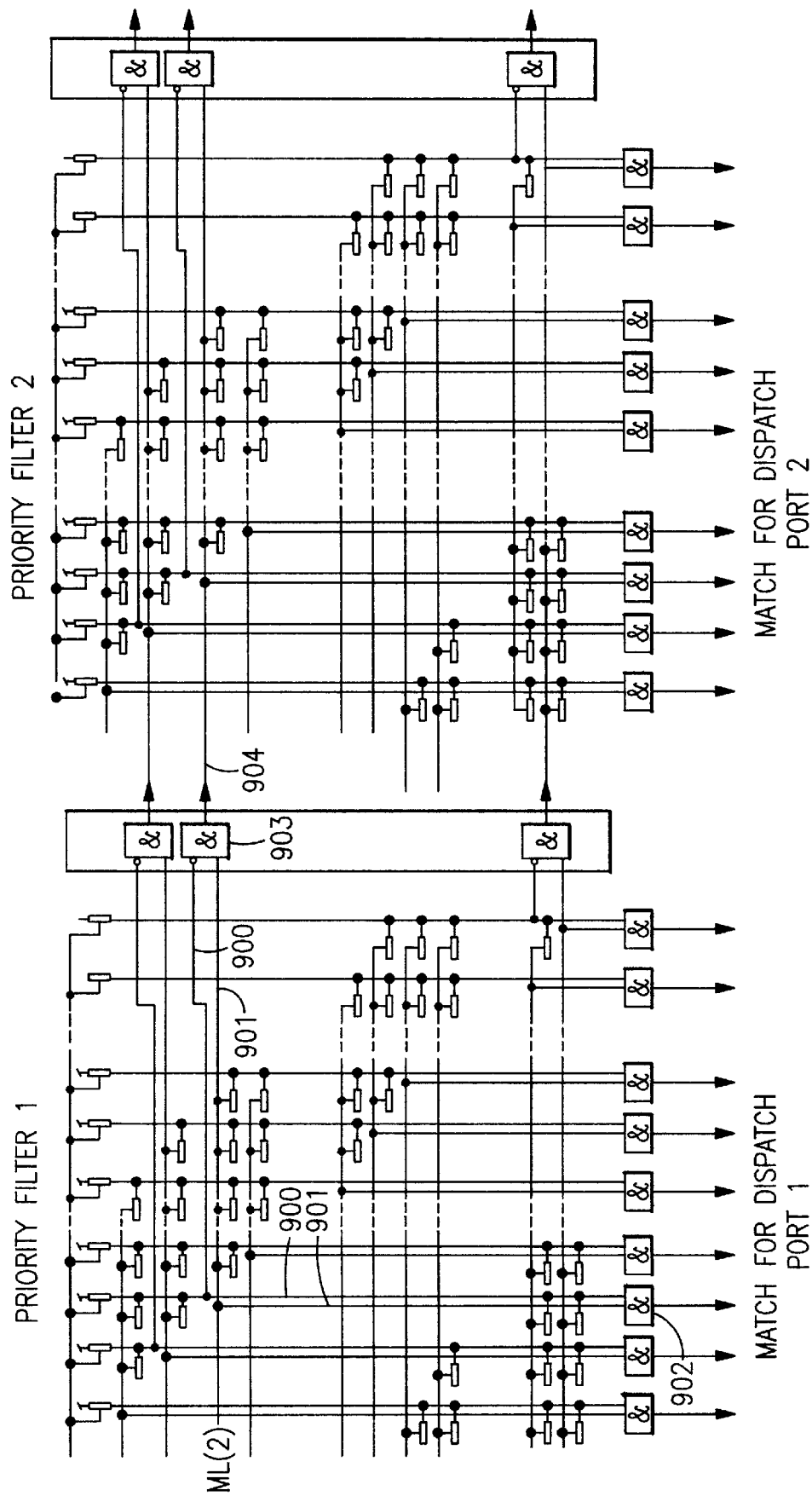
FIG. 9 depicts a way of cascading several priority networks, in order to provide several matches having sequential priority.

In FIG. 9, a cascade showing several priority filters is given. Such a cascade is necessary in order to not only determine the oldest or the youngest entry fulfilling a condition, but a number of oldest or youngest entries fulfilling a condition. The principle will become clear when looking at an ML(2) (901), which is to be an active match line. in case this match line is not blocked by any other match line, its corresponding inhibit line (900) will be on "high". in this case, ML(2) is the oldest match line, and the output of AND-gate 902 will be active, in order to indicate this. As ML(2) has already been selected as the oldest active match line by priority filter 1, it is not to be forwarded to priority filter 2. The inhibit line 900 is forwarded to the inverted input of AND-gate 903. Therefore, as long as inhibit line 900 is "high", match line 904 will be inactive.

The situation is different if (2) has been blocked by any other older match line. In this case, its corresponding inhibit line 900 will be set to "low", and the output of AND-gate 902 will be inactive. This means that ML(2) is not the oldest entry fulfilling said criterion. But is still could be the second oldest entry fulfilling said criterion. inhibit line 900 is connected to the inverted input of AND-gate 903, and the active match line 901 itself is connected to the non-inverted input. Therefore, output 904, which constitutes one of the match lines relevant for priority filter 2, is active, and ML(2) will be considered in the next connection step.

By adding further priority filters to the priority filter cascade, it is possible to simultaneously select a number of entries having sequential priority. Dispatching several instructions in one cycle from an instruction buffer to a number of execution units is one example where such a cascaded circle is useful. But the invention is in no way restricted to instruction window buffers.

We claim:

1. A wrap-around buffer, comprising
    n real entry positions for holding entries,
    a first set of entry positions comprising a continuous sequence of real entry positions ranging from a first entry of said sequence to a last entry of said sequence,
    a second set of entry positions, comprising all of said entry positions which are not contained in said first set of entry positions,
    a subset of predetermined entries of said first set of entry positions,
    characterized by
    means for providing at least n additional virtual entry positions in said second set of entry positions, means for determining the sequentially most recent entry or the sequentially least recent entry of said subset of predetermined entries, whereby said means inhibit, starting from each of said predetermined entries of said subset of predetermined entries, at least (n−1) adjacent entry positions including said virtual entry positions.

2. A wrap-around buffer according to claim 1, characterized in that said subset of predetermined entries of said first set of entry positions contains all of said entries in said first set of entry positions which fulfill a predetermined criterion.

3. A wrap-around buffer according to claim 1, characterized in that said means for providing at least n additional virtual entry positions in said second set of entry positions append at least n virtual entry positions to said wrap-around buffer, and in case a wrap-around of said first set of entry positions exists, which separates said first set of entry positions in two parts, a front part and a rear part, said means for providing at least n additional virtual entry positions copy one of said two parts to said virtual entry positions of said wrap-around buffer.

4. A wrap-around buffer according to claim 1, characterized in that said means for determining the sequentially most recent entry or the sequentially least recent entry of said subset of predetermined entries comprise means for recombining said real entry positions and said virtual entry positions.

5. A wrap-around buffer according to claim 1, characterized in that said wrap-around buffer is an instruction window buffer, whereby each entry in said first set of entry positions holds an instruction.

6. A wrap-around buffer according to claim 5, characterized in that said subset of predetermined entries of said first set of entry positions contains those entries of said entries in said first set of entry positions for which all source operands of an instruction held in said entry are available.

7. A wrap-around buffer according to claim 1, characterized in that said means for determining the sequentially most recent entry or the sequentially least recent entry of said subset of predetermined entries further comprise one match line per entry position, whereby said virtual entry positions are included, and whereby each match line is active in case its corresponding entry position holds an entry belonging to said subset of predetermined entries of said first set of entry positions.

8. A wrap-around buffer according to claim 7, characterized in that said means for determining the sequentially most recent entry or the sequentially least recent entry of said subset of predetermined entries further comprise one inhibit line per match line, whereby said inhibit line inhibits said match line corresponding to at least (n−1) adjacent entry positions.

9. A method for determining sequential priority of entries in a wrap-around buffer, said wrap-around buffer comprising n real entry positions for holding entries, a first set of entry positions, comprising a continuous sequence of real entry positions ranging from a first entry of said sequence to a last entry of said sequence, a second set of entry positions comprising all of said real entry positions of said wrap-around buffer which are not contained in said first set of entry positions, a subset of predetermined entries of said first set of entry positions, said method being characterized by the following steps:

providing at least n additional virtual entry positions in said second set of entry positions, determining the sequentially most recent entry or the sequentially least recent entry of said subset of predetermined entries by inhibiting, starting from each of said predetermined entries of said subset of predetermined entries, at least (n−1) adjacent entry positions including said virtual entry positions.

10. A method according to claim 9, characterized in that said subset of predetermined entries of said first set of entry positions contains all of said entries in said first set of entry positions which fulfill a predetermined criterion.

11. A method according to claim 9, characterized in that said wrap-around buffer is an instruction window buffer, with each entry in said first set of entry positions holding an instruction.

12. A method according to claim 11, characterized in that said subset of predetermined entries of said first set of entry positions contains those entries of said entries in said first set of entry positions for which all source operands of an instruction held in said entry are available.

13. A method according to claim 9, characterized in that said step of providing at least n additional virtual entry positions in said second set of entry positions comprises the steps of:

appending at least n virtual entry positions to said wrap-around buffer, and in case a wrap-around of said first set of entry positions exists, which separates said first set of entry positions in two parts, a front part and a rear part, copying one of said two parts to said virtual entry positions of said buffer.

14. A method according to claim 9, characterized in that said step of determining the sequentially most recent entry or the sequentially least recent entry of said subset of predetermined entries comprises a step of recombining said real entry positions and said virtual entry positions.

* * * * *